Jan. 27, 1970  B. S. VILKOMERSON ET AL  3,492,632
DOPPLER ACTUATED CONTROL CIRCUIT FOR DEPTH CHARGES
Filed April 12, 1946
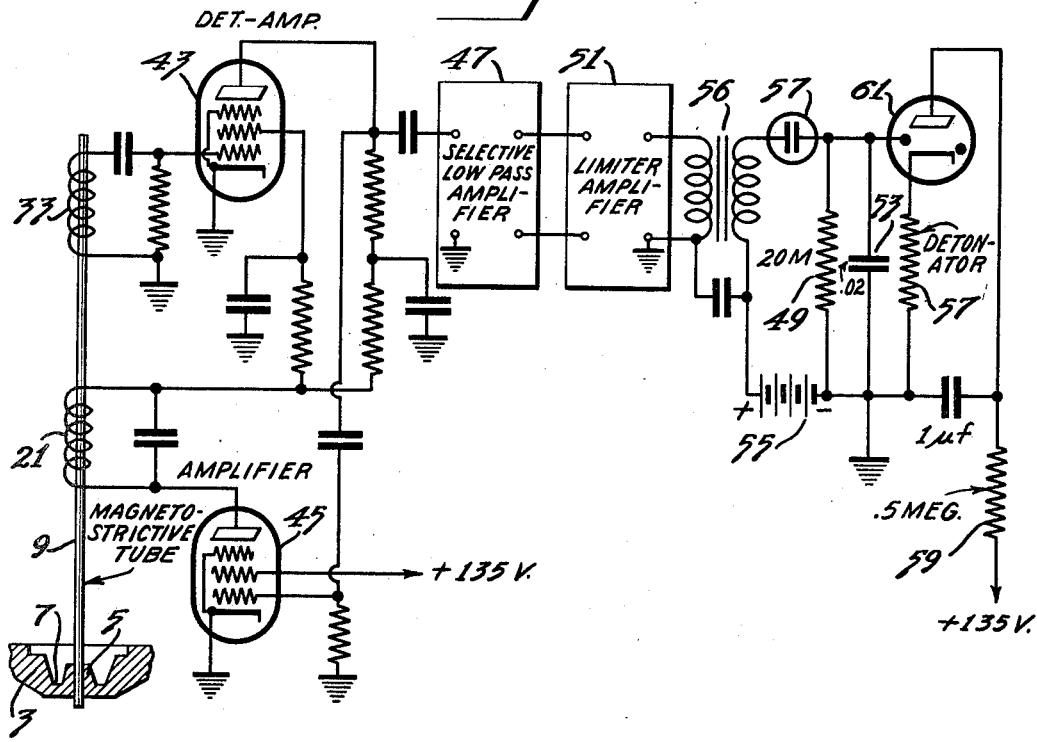
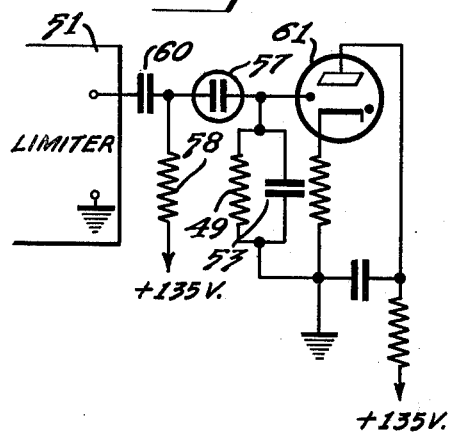
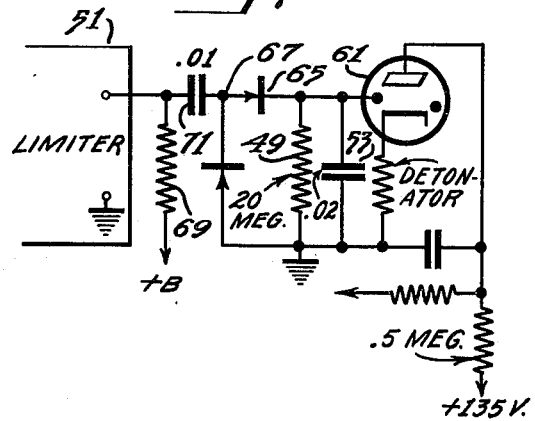
INVENTOR.
Benjamin S. Vilkomerson
& Herbert Belar
BY
ATTORNEY

United States Patent Office

3,492,632
Patented Jan. 27, 1970

3,492,632
DOPPLER ACTUATED CONTROL CIRCUIT
FOR DEPTH CHARGES
Benjamin S. Vilkomerson, Camden, and Herbert Belar, Palmyra, N.J., assignors, by mesne assignments, to the United States of America as represented by the Secretary of the Navy
Filed Apr. 12, 1946, Ser. No. 661,498
Int. Cl. G01s 9/66
U.S. Cl. 340—3                                    2 Claims This invention relates to apparatus for and a method of controlling the firing of an explosive charge, and more particularly to an improved apparatus and method of this type which are especially suitable for submarine use.

A copeding application, Ser. No. 510,798, filed Nov. 18, 1943, for Apparatus for and Method of Controlling the Firing of an Explosive Charge, by Frank A. Hester, Jr., describes and claims a system for setting off an explosive depth charge. The present invention is an improvement over the previous system, and has for its primary object the provision of means for preventing premature explosion of the charge due to failure of power supply, tubes or other component parts after it has been armed.

In accordance with the copending application referred to above, there is provided a heterodyne detecting device consisting of a magnetostriction loudspeaker-microphone-oscillator unit provided with a vibratory diaphragm and a magnetostriction rod secured at one end to the diaphragm. At the two motional nodes of the magnetostriction rod, a pair of coils are coupled thereto coaxially with the rod, one coil constituting a driving or transmitting coil and the other a driven or receiving coil. The two coils are connected to two vacuum tubes which, in turn, are connected in cascade, the first tube receiving its signal from the driven coil, and the second tube receiving its signal from the first tube, and the second tube being connected so as to supply a signal to the driving coil which is coupled to the driven coil through the magnetostrictive vibrations. This circuit oscillates at the frequency of the vibratory system and introduces an acoustic signal into the water through the diaphragm.

If the signal emitted by the unit thus far described is reflected from an object, and there is relative movement between the unit and the object, a Doppler effect shift in the frequency of the reflected signal will occur. Upon striking the diaphragm, the reflected signal will set up in the rod very small vibrations which will regenerate around the oscillator circuit, thereby resulting in the detection of a heterodyne between the reflected and the outgoing signals. The heterodyne frequency will depend upon the relative speed of the reflecting target or other object with respect to the transducer unit above described, and will fall to zero at the minimum distance between them. A selective amplifier and firing circuit, set to fire the explosive charge when some suitable low heterodyne frequency is reached, are connected to the output of the detector.

It is a further object of this invention to provide an improved method of and apparatus for firing depth charges and the like so that such charges will not explode until they have reached a minimum distance from the target.

One disadvantage of the prior systems is that the plate circuit of the final amplifier was coupled directly to the Thyratron control grid. Plate current through the plate resisotr in the absence of a signal held the D.C. potential of this grid below its critical voltage. Signal currents reduced the plate current, thus increasing the potential which, after a short delay, operated the control tube. Consequently, if for any reason the tube should crack when discharged, or the filament of the amplifier should fail, or the filament battery or a circuit connection should fail, the full anode voltage would be applied to the Thyratron grid and the charge would detonate. The present invention overcomes this difficulty by decoupling the Thyratron for D.C. voltages from the amplifier plate. It is, therefore, a further object of this invention to provide a novel method of and means for controlling the operation of a gaseous discharge tube to prevent it from becoming conductive as a result of a failure of component parts in circuit therewith.

In brief, the above objects are accomplished by utilizing a gas triode to operate the detonating mechanism, and applying an A.C. control voltage to said triode through a biased rectifier to charge a capacitor having a fixed time constant discharge path. A single pulse, being limited in amplitude, is insufficient to charge the capacitor up to the firing voltage of the gas tube. Random pulses leak off through the discharge circuit. Only when a continuing series of pulses are received will the capacitor become charged to the firing voltage of the gas tube to operate the mechanism. The firing circuit is isolated with respect to D.C. voltages so that any circuit failure which produces a D.C. voltage change will not cause the detonator to operate.

The novel features that we consider characteristic of our invention are set forth with particularity in the appended claims. The invention itself, however, both as to its organization and method of operation, as well as additional objects and advantages thereof, will best be understood from the following description of two embodiments thereof, when read in connection with the accompanying drawings, in which FIG. 1 is a schematic diagram of a preferred embodiment of this invention, and FIGS. 2 and 3 are schematic diagrams of alternative control circuits which may be employed.

Referring more particularly to the drawings, there is shown in FIG. 1 a control device adapted to be mounted within a depth charge, shell, or the like as shown in greater detail in the Hester application referred to above. The control device comprises a diaphragm 3 on which a magnetostrictive rod or tube 9 is secured and forms therewith a vibratory system. The diaphragm 3 is mounted in a suitable water-tight casing, not shown.

Surrounding the magnetostrictive rod in coaxial relation therewith and in proximity to the diaphragm 3 is a winding 21 constituting a driving coil. An annular magnet, not shown, disposed about the coil 21 and secured to the diaphragm 3, supplies a biasing flux to the vibratory system. Above the first coil 21 is a second coil or winding 33. The coil 33 is also disposed about and in coaxial relation with the rod 9 and acts as a receiving coil in a manner to be presently described.

The receiving or driven coil 33 is connected to the input circuit of a pentode vacuum tube 43, such as a type 1T4 tube, which operates as a combined detector and amplifier. The output circuit of the tube 43 is connected to the input circuit of a vacuum tube amplifier 45, such as a type 3A4 tube, the latter acting as a power amplifier. The driving coil 21 is connected in the output or plate circuit of the power amplifier 45. The arrangement is such that the vibratory system constituted by the piston-like diaphragm portion 5, magnetostrictive rod 9, the two windings 21 and 33, and the tubes 43 and 45, form an oscillating circuit or system which generates the outgoing signal. The tube 43 excites the tube 45 which then drives the rod 9 through its output or plate coil 21, while the rod 9, in turn, excites the tube 43 through the receiving or grid coil 33 thereof. This oscillatory system is arranged to oscillate at the natural frequency of the vibratory system comprised of the diaphragm portion 5 and the rod 9, and may be approximately 25 kc.

The output of the tube 43 is also coupled to a selective low pass amplifier, containing the necessary filter sections to limit its transmission of energy to frequencies of the order of 30 cycles per second, for example. The amplification within the pass frequency range is sufficient to drive a limiter amplifier 51 to which it is connected. The limiter amplifier 51 is characterized in that it will not respond to weak signals, while its output is constant for signals exceeding the minimum value. Complete details of the selective low pass amplifier and the limiter amplifier will be found in the copending application of Hester, referred to above, and need not be repeated here.

The alternating current output of the limiter 51 is applied through a coupling transformer to the first electrode of a miniature cold cathode glow-lamp rectifier 57, such as the General Electric N.E. 2, 1/40 watt neon glow lamp, although other types having similar characteristics could be used. The other electrode of the rectifier is connected (a) through a resistor 49 to ground, (b) through a storage device such as capacitor 53 to ground, and (c) to the control electrode of a normally blocked grid controlled gaseous discharge tube 61, such as a Thyratron. The first electrode is also connected through the transformer secondary to a source of positive bias voltage 55. The cathode circuit of the Thyratron includes a detonator, represented by resistance 57. The anode is connected to a suitable source of positive potential through resistor 59.

Before proceeding with a description of the operation of the apparatus thus far described, it may be pointed out that the well-known Doppler effect is employed to obtain firing of the charge at substantially the point of closets approach to the target, such as a submarine. The method of utilizing this effect will now be explained.

Assuming that the submarine has been located, a depth charge is dropped at a point as nearly over the submarine as can be judged. When the charge has reached a certain depth below the surface of the water, pressure-operated switches therein function in a well known manner immaterial to the present invention to close the various circuits to the several power sources indicated schematically in FIG. 2. As soon as the oscillatory system consisting of the diaphragm portion 5, the magnetostrictive rod 9, the coils 21 and 33, and the tubes 43 and 45 begins to function, the vibratory diaphragm portion 5 projects a continuous, high frequency acoustical wave toward the submarine which reflects the wave back to the diaphragm 3. This all takes place while the depth charge is moving relative to the submarine. Due to the relative velocity which exists between the depth charge and the submarine the received, reflected signal and the outgoing, transmitting signal will differ slightly in frequency, pursuant to the Doppler effect, the frequency difference depending upon the magnitude of the relative velocity between the charge and the submarine.

If the angle $\theta$ is the angle made at any instant between a line from the depth charge to the center of the submarine and a horizontal line passing through the submarine, $f$ the frequency of the transmitted signal, $V$ the downward velocity of the depth charge, and $C$ the velocity of sound in water, the difference frequency $f_d$ between the two signals at that instant is given by the expression $$f_d = f \frac{2V}{C} \sin \theta$$

As the depth charge passes by the submarine, the frequency difference $f_d$ will vary from a maximum value when the device first starts operating (for example, 150 cycles per second) to zero, the zero value occurring at the instant of closest approach of the depth charge to the submarine; that is, when sin $\theta$ equals zero and the charge and the submarine are substantially both on the same horizontal plane. This is the ideal point at which the charge should be fired. However, in practice, this is very difficult to realize. Consequently, the charge is made to fire when the frequency difference $f_d$ is in the neighborhood of about 30 cycles per second which corresponds to an angle $\theta$ of about 11.5° from the horizontal.

Referring once more to FIG. 1, it will be seen that when the reflected signal, which is extremely weak, is received by the diaphragm portion 5, the rod 9 is caused to vibrate, thereby setting up weak signals in the receiving coil 33. Signals generated in the coil or winding 33 are then amplified by regeneration around the oscillator loop. Due to the regeneration, the amplitude of the received signal is sufficient to produce a heterodyne on the grid of the tube 43. Thus, a component whose frequency is the difference in frequency between the outgoing and reflected signals appears in the output of the tube 43, since this tube also acts as a simple grid leak detector, as shown in FIG. 1. The circuit is designed so that the tube 43 will operate at maximum detector sensitivity, while the tube 45 operates at maximum power output. It is for this reason that the two tubes 43 and 45 are employed instead of a single tube in which either sensitivity or power would have to be sacrificed.

The heterodyne signal representing the difference in frequency between the transmitted and reflected waves is applied to the input of the amplifier 47 which is designed to pass only very low frequencies. Thus, when the frequency difference between the transmitted and received signals is of the order of 30 cycles, the signal is passed by the selective amplifier and is applied to the limiter amplifier 51. The characteristic of this circuit is such that it will not respond at all to weak signals, while the response to strong signals is independent of signal strength, as described in greater detail in the Hester application referred to above.

As pointed out above, one disadvantage of the firing circuit proposed by the earlier system is that the control grid of the Thyratron was connected directly to the plate of the limiter amplifier. Thus the failure of this tube or of the filament battery supply would cause the depth charge to explode if the failure occurred after the device was armed. The reason for this is that the plate voltage of a vacuum tube increases when the plate current decreases, due, for example, to a burned out filament. The high positive voltage would be applied directly to the Thyratron, and after approximately 0.2 second delay required to charge the capacitor in the delay circuit, the Thyratron would fire and detonate the charge. The possibility of this happening is obviated in the present invention.

It will be observed that the limiter is coupled to the Thyratron firing circuit for A.C. voltage variations only, through transformer 56. The A.C. signal voltage is in series with the D.C. bias voltage 55 and is applied across the neon rectifier 57. In the first illustration the bias voltage is of such value that by itself it cannot exceed the critical voltage of the rectifier tube 57 and therefore cannot cause it to break down and conduct. However, when the A.C. signal voltage is in such a phase as to add to the D.C. bias voltage, the total applied voltage exceeds the critical voltage and the tube breaks down and conducts; when it is of opposite phase, it subtracts from the bias voltage, the discharge stops, and no current flows. This means that a pulsating, unidirectional current flows into capacitor 53 and builds up a voltage across the capacitor. After a sufficient number of pulses this voltage will approach the peak value of the applied A.C., less the difference between the break-down voltage of the lamp and the D.C. bias voltage. In passing, it should be noted that, unlike a hot cathode diode rectifier, the power output of this neon tube rectifier can be much greater than the A.C. signal power input. This is because in the non-conducting condition the neon tube is an almost infinite impedance, and voltage only (negligible current or power) is required to start the discharge. Once the discharge is initiated, the bias battery will maintain the discharge in the range between the break-down and extinction voltages, the battery current being limited only by the external circuit resistances and the resistance of the neon tube in the conducting condition, which is quite low. In this respect the circuit can be compared to a voltage-operated polarized relay, with output power supplied by the local battery. Thus in the presence of a signal the voltage across a capacitor 53 will gradually increase to a value sufficient to trigger the Thyratron 61 and detonate the charge. Random pulses which are received and pass the selective filter or which are generated within the device may cause isolated charging impulses to flow into capacitor 53 from time to time but unless they persist above a certain rate, the charge is bled off through resistor 49 faster than it tends to build up. It is extremely unlikely that such random impulses will persist long enough or at sufficient frequency to build up the charge to the critical point. Certainly the single pulse resulting from the failure of a battery or other component cannot detonate the charge.

FIG. 2 illustrates an alternative embodiment, in which capacitive coupling to the limiter is employed. In this case the output of limiter 51 and a positive biasing voltage are applied in parallel to the neon lamp 57, the voltage being supplied by any convenient source through a resistor 58. The other circuit connections are the same as before. In this case, the potential source is given such a value that when the voltage is applied, the lamp breaks down and capacitor 53 starts to charge. When the voltage across the capacitor reaches a certain value, say 45 volts, the voltage across the lamp drops below the extinction voltage, at which point the charging current stops. Capacitor 53 then slowly discharges through resistor 49 and the voltage across the capacitor drops, while the voltage across the lamp rises until the break-down voltage is reached and the charging cycle starts again. Thus, in the absence of a signal, the lamp 57 flashes often enough to maintain a potential of about 45 volts on the capacitor, and also on the control electrode of Thyratron 61 which is therefore constantly biased to a value nearer its break-down voltage, thus increasing its sensitivity, since a smaller signal voltage is required to cause it to fire. When signal voltage from the limiter is impressed on the glow lamp 57 the frequency and intensity of the flashes increase. This is because alternate positive half-cycles add to the biasing voltage applied to the neon lamp 57 and it becomes conductive with each pulse, charging capacitor 53 and increasing its voltage. If the signal persists through a sufficient number of cycles, the voltage finally reaches a value of approximately 70 volts which is high enough to fire the gas triode 61. The purpose of resistor 49 is to provide a leakage path across the capacitor so as to keep the no-signal charging pulses from adding up and reaching the firing voltage. The same system may, of course, be applied to the transformer-coupled system of FIG. 2 by suitably increasing the bias potential 55, with resulting increased sensitivity.

A further modification employing selenium rectifier stacks is illustrated in FIG. 3. The limiter 51 output is coupled through capacitor 71 to the parallel connected capacitor 53 and resistor 49 through a first selenium rectifier 65. This device, as is well known, has the characteristic of passing current in one direction only, and is thus equivalent to the glow lamp 57 of the preceding figures. It is connected so as to pass current from the limiter 51 into capacitor 53 when a positive voltage with respect to ground is applied to point 67. A second selenium rectifier is connected between point 67 and ground, and is polarized so as to prevent the flow of the same current to ground. This is a conventional voltage-doubler circuit. It should be noted that a lower plate load resistance 69 and lower impedance coupling condenser 71 are needed with the selenium rectifier than with the neon rectifier. This is partly because the neon rectifier has to supply only the difference between the 45 volts initial bias and the 70 volt firing potential of the Thyratron 61, and also because of the before-mentioned relay action of the neon rectifier. With the selenium rectifier all of the energy needed to reach the firing voltage must be developed from the signal, and more power from the limiter and the use of a voltage doubler are therefore necessary.

The operation of the selenium rectifier system is similar to that of the neon lamp. Due to the frequency cut-off characteristic of the low pass amplifier, signals reflected from the bottom of the ocean, for example, which are of the order of 150 cycles, will not be passed and cannot operate the detonator. The limiter prevents single pulses from reaching an amplitude sufficient to charge the capacitor 53 to the Thyratron firing voltage. The bleeder resistor 49 prevents the accumulation of random charges over a long period of time. Consequently, only low frequency signals, resulting from a Doppler effect frequency indicative of minimum relative motion, persisting continuously over a period of time, can raise the capacitor voltage, and hence the control grid voltage, to the value necessary to fire the Thyratron and thus detonate the charge.

What we claim is:

1. A control circuit which is responsive to a sequence of pulses from a signal source and which is unresponsive to stray pulses from said source comprising a grid controlled gas tube having at least grid, cathode and anode electrodes, said tube being conductive when its grid voltage exceeds a predetermined value, a capacitor coupled between the grid and cathode of said gas tube, the charge on said capacitor determining the potential on said grid, a cold cathode discharge tube coupled between said capacitor and said signal source an through which signal pulses are applied to said capacitor, means to apply a biasing potential to said cold cathode tube, the amplitue of said biasing potential being less than the critical voltage of said cold cathode tube by an amount less than the amplitude of the voltage from the signal source whereby said cold cathode tube is made conductive only in the presence of signal source voltage, and means to continuously discharge said capacitor at a rate lower than the charging rate thereof due to signal pulses whereby stray pulses will not accumulate sufficient charge on said capacitor to render said gas tube conductive.

2. The control circuit recited in claim 1 wherein the amplitude of said biasing potential is greater than the critical voltage of said cold cathode tube but is less than the said predetermined value of the grid voltage required to render the gas tube conductive.

References Cited

UNITED STATES PATENTS

| | | | |
|---|---|---|---|
| 2,145,724 | 1/1939 | Harsley | 320—1 |
| 2,269,460 | 1/1942 | Klemperer | 219—4 |
| 2,357,652 | 9/1944 | Haynes | 79—100 |
| 2,367,049 | 1/1945 | Petty | 177—352 |
| 2,337,522 | 12/1943 | Elderedge | 250—27 |
| 2,224,134 | 12/1940 | Blumlier | 250—27 |
| 2,287,926 | 6/1942 | Zepler | 250—27 |
| 2,341,351 | 2/1944 | Barkley | 250—27 |
| 2,357,652 | 9/1944 | Haynes | 250—27 |
| 2,444,568 | 7/1948 | Isserstedt | 250—27 |
| 2,407,654 | 9/1946 | Deserno | 250—27 |
| 2,410,868 | 12/1946 | De Forest | 250—27 |

RICHARD A. FARLEY, Primary Examiner

U.S. Cl. X.R.

102—18; 328—210; 343—7